3,242,182
INDANTHRONE PROCESS
Chi K. Dien, Buffalo, N.Y., assignor to Allied Chemical Corporation, New York, N.Y., a corporation of New York
No Drawing. Filed Apr. 16, 1962, Ser. No. 187,938
7 Claims. (Cl. 260—263)

This invention relates to organic pigments and processes for producing them. It relates more particularly to novel pigmentary forms of indanthrone and processes for producing the same.

Indanthrone (N,N'-dihydro - 1,2,2',1' - anthraquinone-azine, C.I. 69800) is a well known organic compound used as a vat dye, as an intermediate for the manufacture of other vat dyes, and as an organic pigment.

Indathrone exists in four polymorphic crystal forms which are identified as the alpha, beta, gamma and delta forms. The manufacture of indanthrone usually involves the production of the compound in the form of a soluble leuco derivative which is then precipitated out of solution. The crystal form in which indanthrone is obtained in the course of manufacture varies with the conditions of manufacture and the subsequent treatment to which the indanthrone product is subjected.

For use as a vat dyestuff, the physical form of indanthrone is ordinarily controlled to provide a material having maximum dyeing properties and one capable of being readily shipped and stored.

For use as a pigment, the conditions of manufacture and the subsequent treatment of indanthrone are controlled to give a product having the desired pigmentary properties. Of the various polymorphic forms, the gamma form has been preferred heretofore because of its reddish shade of blue, the alpha and beta forms having a greenish-blue shade and the delta form having practically no color value.

It is known to produce indanthrone in the gamma form by passing air slowly through an aqueous alkaline solution of the leuco derivative at low temperatures such as 20°–35° C. The resulting product, while reddish-blue, is a dull pigment which is tinctorially weak. Moreover, this method of manufacture requires a long period of oxidation (20–40 hours) and leads to objectionable variation in the shade of the pigment obtained. In order to overcome this variation it has been necessary to adjust the shade of the pigment thus obtained by admixture of other shading pigments with it; but since the added pigments rarely have properties identical with those of said indanthrone pigment, this leads to undesired variation in shade of the final product (paint, lacquer, etc.) in which the pigment is used.

It is also known to prepare indanthrone in a form having superior redness of tint as compared with the gamma-form by oxidizing an aqueous suspension of the leuco form of indanthrone with a water soluble nitro aromatic compound of the benzene series, e.g. sodium m-nitrobenzene sulfonate (U.S.P. 2,091,102). However, this procedure requires large amounts of a costly oxidizing agent and hence is uneconomical.

It is an object of the present invention to provide an improved process for preparing indanthrone in the form of reddish-blue pigments having enhanced tinctorial strength and brightness.

Another object of the present invention is to provide a reproducible, economical process for preparing indanthrone in the form of reddish-blue pigments.

A further object of the present invention is to provide a process for preparing indanthrone in the form of reddish-blue pigments which employs readily available, inexpensive reagents, and does not require costly or elaborate equipment.

An additional object of the present invention is to provide indanthrone in the form of reddish-blue pigments having enhanced tinctorial strength and brightness.

Other objects of the invention will in part be obvious and will in part appear hereinafter.

In accordance with the process of the present invention, indanthrone is subjected to a controlled oxidation treatment while in solution in sulfuric acid, and the resulting indanthrone is precipitated in the form of a reddish-blue pigment by drowning the resulting acid solution under controlled conditions in an aqueous solution of a reducing agent of a particular type.

Under certain conditions of carrying out the oxidation treatment, and as a preferred method of operation, the process of the present invention also includes a further treatment of the resulting pigment with an aqueous alkaline solution of a reducing sugar of controlled concentration.

I have discovered that the masstone, tinctorial strength and tint of indanthrone in pigment form can be controlled by proper selection of the oxidizing and reducing agents employed in said treatment, and by control of the concentration thereof, as well as the temperature conditions of the treatments.

This result is surprising because the treatment of indanthrone in sulfuric acid with manganese dioxide suspended in sulfuric acid, followed by slowly pouring the sulfuric acid solution into water and adding sodium bisulfite thereto results in a pigment of greenish-blue shade.

In carrying out the process of the present invention, indanthrone is dissolved in sulfuric acid and the resulting solution is treated with a controlled amount of nitric acid (or manganese dioxide or chromium trioxide) under controlled temperature conditions.

To effect complete solution of the indanthrone, the concentration of the sulfuric acid solvent should be about 95% to 100%. About 7 parts by weight of 95% sulfuric acid or about 5 parts by weight 100% sulfuric acid are required to dissolve one part by weight of indanthrone at about 25°–30° C. Preferably about 10 to about 15 parts by weight of 100% sulfuric acid are employed per part of indanthrone.

It is preferable to employ as starting material indanthrone which has been purified by sulfuric acid fractional crystallization, such as that set out in FIAT Final Report 1313, volume II, page 78. Crude indanthrone can be used, if desired, but in that case additional oxidizing agent is preferably used to compensate for the amount of oxidizing agent which reacts with the impurities. Accordingly, in the following description and in the claims, the amount of oxidizing agent is defined in terms of the amount of sulfuric acid-purified indanthrone present in the reaction mixture, it being understood that additional oxidizing agent will be employed in the case of less pure indanthrone.

The quantity of the oxidizing agent employed in the oxidation treatment is critical; for each part by weight of the indanthrone charged, an amount of oxidizing agent at least equal to 0.04 part by weight of $HNO_3$ is required. Quantities of oxidizing agent equal to (or greater than) about 0.3 part by weight of $HNO_3$ (per part by weight of indanthrone) can be used, but such large amounts are wasteful of the reagent. Preferably, the amount of oxidizing agent employed (per part by weight of the indanthrone) is equal to 0.05 to 0.15 part by weight of $HNO_3$.

In accordance with the present invention, the quantity of oxidizing agent employed controls the tint, masstone, and tinctorial strength of the pigment produced. Thus, in general pigments of the greatest redness of tint and tinctorial strength are obtained by employing amounts of oxidizing agent equal to 0.07 to about 0.15 (or more)

parts of $HNO_3$ per part of indanthrone (by weight). On the other hand, pigments of the darkest masstone are generally obtained by employing an amount of oxidizing agent equal to about 0.05 to 0.07 part of $HNO_3$ per part of indanthrone.

A pigment of the optimum combination of a high degree of redness of tint, enhanced masstone, and high tinctorial strength is obtained by using an amount of oxidizing agent equal to about 0.1 part by weight of $HNO_3$ per part of indanthrone (by weight). With lesser amounts of oxidizing agent, pigments of darker masstone but of lower degree of redness and tinctorial strength are obtained; conversely, by using greater amounts of the oxidizing agent, pigments of a lighter masstone but higher degree of redness and tinctorial strength are produced.

In carrying out the oxidation treatment, the temperature of the reaction mixture is maintained below about 90° C. While the use of higher temperatures is effective, it may result in undesirable side reactions, such as cleavage of the indanthrone to 2,3-dihydroxy-2,8-phthaloyl-quinoxaline. Preferably, the temperature is maintained between within the range about 20° and about 40° C.

Generally the oxidation treatment is completed in about one-half to one hour. When using an amount of oxidizing agent equal to about 0.1 part of $HNO_3$ per part of indanthrone (by weight) the period of the oxidation treatment is about 40 minutes.

When the oxidation treatment has been completed, the resulting oxidation reaction mixture is drowned, with vigorous agitation, in an aqueous reducing solution containing ferrous sulfate or other ferrous salt of a non-oxidizing acid, or an alkali metal sulfite or bisulfite, in an amount equivalent to at least 2 mols of $FeSO_4$ per mol of $HNO_3$ employed in the oxidation treatment (that is, having a reducing power at least as great as the oxidizing power of the amount of oxidizing agent employed in the oxidation treatment), so that upon completion of the reduction treatment, the reduction solution will still have reducing action. Thus, in this context, an amount of ferrous sulfate containing 2 mols of $FeSO_4$ is equivalent to an amount of sodium sulfite containing 1 mol of $Na_2SO_3$ or an amount of sodium bisulfite containing 1 mol of $NaHSO_3$.

As reducing agent, ferrous sulfate in various forms (heptahydrate or anhydrous), or other ferrous salts of non-oxidizing acids (e.g., ferrous chloride, ferrous acetate, etc.), or alkali metal sulfites or bisulfites may be used.

Preferably the aqueous reducing solution in which the oxidation reaction mixture is drowned should contain an excess of reducing agent, and especially about a 30% to 300% excess based on the above relation of 2 mols of $FeSO_4$ per mol of $HNO_3$ employed. For optimum results, the aqueous reduction solution should contain a quantity of reducing agent equal to an excess of about 78% (on the stated basis).

In order to assist in the production of the pigment in the form of finely divided pigment particles of substantially uniform size, and to dissipate the heat generated by the dilution of the sulfuric acid, the aqueous reduction solution should contain at least 2.2 parts, more particularly 2.2 to 5 parts, of water per part (by weight) of sulfuric acid present in the oxidation reaction mixture. Much larger amounts of water (e.g., 10 or more parts) serve no useful purpose. Preferably the aqueous reduction solution contains 2.9 to 4.8 parts of water per part (by weight) of sulfuric acid.

The initial temperature of the aqueous reduction solution is not critical but to assist in the production of finely divided pigment particles of relatively uniform size, it is preferably between about 60° and 70° C. Optimum results are obtained when the initial temperature of the aqueous reduction solution is about 70° C. During the drowning of the acid solution, the mixture is vigorously stirred to aid production of finely divided pigment particles and assist in the dissipation of the heat of dilution of the sulfuric acid.

A reaction time of about a quarter of an hour to one hour is generally sufficient for the reduction treatment. When using an amount of oxidizing agent equal to about 0.1 part of $HNO_3$ per part of indanthrone (by weight), the time required for completion if the reduction treatment is about 40 minutes.

If desired, on completion of the reduction treatment, water at the prevailing room temperature can be added to facilitate cooling and lower the acid concentration.

After the reduction treatment has been completed, the pigment is recovered from the remaining liquid. This is usually accomplished by filtration, but other methods of separation may be employed. The recovered pigment mass (e.g., filter-cake) is washed with water to remove the acid, and may then be dried if desired.

Preferably the pigment mass, after washing with water, is subjected to an additional reduction treatment with an aqueous alkaline solution of a reducing sugar, especially if an amount of oxidizing agent equal to less than 0.05 part, or greater than 0.07 part, of $HNO_3$ per part of indanthrone (by weight) was employed in the oxidation treatment; otherwise a dull greenish-blue pigment is obtained.

In carrying out the additional reduction treatment, the filter-cake or other recovered mass of pigment is heated in an alkaline aqueous solution of a reducing sugar (for example, glucose) containing an amount of reducing sugar at least equal to 1 mol of reducing sugar per mol of oxidizing agent (calculated on the basis of 1 mol of $HNO_3$, or the $HNO_3$ equivalent of the other oxidizing agents). Preferably the amount of reducing sugar used is greatly in excess of an equimolar amount, more specifically a molar excess of about 500% to 750%. For optimum results, an amount of glucose equal to a molar excess of about 730% is employed. The concentration of the solution with respect to the reducing sugar is not critical; ordinarily about a 0.2 molar solution is used.

The aqueous alkaline reducing sugar solution preferably contains sodium or potassium hydroxide as the alkali. While the amount used is not critical, an amount equal to about 2 mols of alkali metal hydroxide, per mol of reducing sugar, is ordinarily employed.

The pigment mass is heated at least to the boiling point of the sugar solution, preferably with stirring to break up the mass and secure intimate contact between the pigment and the reducing sugar solution. Preferably the heating is terminated when the mixture begins to boil, which may give a heating period of about half an hour to an hour and a quarter. If desired, the mixture may be heated under reflux at the boiling point, but that tends to yield a final pigment of a somewhat lesser degree of redness of tint. The resulting pigment is then recovered, as by filtration, washed, and dried or converted to a paste, as usual.

The invention will be illustrated by the following specific examples, but it is to be understood that it is not limited to the details thereof and that changes may be made without departing from the scope of the invention. The temperatures are in degrees centigrade and the parts and percentages are by weight.

The starting material employed was sulfuric acid-purified indanthrone which had been obtained by subjecting a crude indanthrone (Carbanthrene Blue RS Crude) to a sulfuric acid recrystallization treatment in the manner set out in FIAT Final Report 1313, volume 2, page 78.

EXAMPLE 1

The sulfuric acid-purified indanthrone (275 parts) was mixed with 3150 parts of 100% sulfuric acid, and the mixture was stirred at 25° to 30° until a solution was formed (about 8 hours). To the solution, 39 parts of 67% nitric acid (corresponding to 0.095 part of $HNO_3$ per part of indanthrone) was added over a period of 15 minutes, and the reaction mixture was stirred for 40 minutes at 35°. The reaction mass was drowned in a vigorously agitated aqueous solution of ferrous sulfate (formed by dissolving 410 parts of ferrous sulfate heptahydrate in 10,000 parts of water) at 70° and, after agitating vigorously for 40 minutes, the mass was filtered and the filter-cake was washed free of acid. The filter-cake was then stirred in 6,000 parts of water, then further diluted with 8,000 parts of water, and the mixture was heated to 60°. Corn syrup (690 parts—90% glucose) and potassium hydroxide (410 parts) were added and the mixture was refluxed for 30 minutes at atmospheric pressure and then cooled to room temperature. The product was collected by filtration and washed with water, yielding 1212 parts of filter-cake (20% solids).

The filter-cake was converted to a paste by stirring it with 959.5 parts of water and 2.5 parts of the sodium salt of the condensation product of formaldehyde and 2-naphthalenesulfonic acid (Tamol N) and the paste was tested for masstone, tint, and tinctorial strength against a paste of a standard reddish-blue pigment (C. I. Pigment Blue 22—Colour Index No. 69810). The differences in tint and masstone between the product and the standard were evaluated according to the following scale arranged in decreasing order of difference: very much, much, considerably, appreciably, slightly and equal. The product was rated very much redder in tint, slightly to appreciably lighter in masstone, and 110% in tinctorial strength.

When compared against the same standard reddish-blue pigment, an indanthrone pigment prepared according to the method of U.S.P. 2,091,102, was rated very much redder but appreciably duller in tint, very much lighter in masstone, and 75–80% in tinctorial strength.

Then 2.8 parts of 67% nitric acid (corresponding to 0.054 part of $HNO_3$ per part of indanthrone) were added and the reaction mass was stirred for an hour. The resulting mixture was drowned in a strongly agitated aqueous solution of ferrous sulfate (80 parts of ferrous sulfate heptahydrate in 1500 parts of water) at 70°. The precipitated solid was collected by filtration and washed free of acid with water. The filter-cake was heated in an aqueous alkaline glucose solution (100 parts of corn syrup—90% glucose and 60 parts of potassium hydroxide in 2400 parts of water) under reflux for an hour. The product was collected by filtration and filter-cake was washed with water and converted to a paste (containing 34 parts of color solids and 296 parts of water) by stirring with the addition of 0.5 part of the sodium salt of the condensation product of formaldehyde and 2-naphthalenesulfonic acid (Tamol N).

When tested as described in Example 1, the resulting pigment was rated much redder in tint, appreciably lighter in masstone, and 85% in tinctorial strength, as compared with the standard pigment employed.

EXAMPLES 3 TO 7

The process of Example 2 was repeated with the variations set out below in Table 1. The properties of the resulting pigments, as compared with the standard pigment employed in Example 1, are also set out in the Table 1.

EXAMPLES 8 TO 13

For purposes of comparison, the procedure of Example 2 was repeated with omission of various features of the invention, as set out below in Table 2. The properties of the resulting pigments as compared with the standard pigment employed in Example 1, are also set out in Table 2.

*Table 1*

| Example | Procedure | Characteristics of pigment compared to Standard | | |
|---|---|---|---|---|
| | | Tint | Masstone | Tinctorial Strength, Percent |
| 3 | As described in Example 2 except 7.0 parts of nitric acid used. | Very much redder and slightly duller. | Considerably lighter. | 110–115 |
| 4 | As described in Example 2 except 4.2 parts of 67% nitric acid used. | Considerably to much redder, slightly duller. | Slightly lighter. | 110 |
| 5 | As described in Example 2 except that reducing sugar treatment omitted. | Much redder. | Slightly darker. | 105 |
| 6 | As described in Example 2 except 2.1 parts of 67% nitric acid used and reducing sugar treatment terminated when the reaction mixture began to boil. | Slightly redder. | Close. | 102 |
| 7 | As described in Example 2 except 1.4 parts of 67% nitric acid used and reducing sugar treatment terminated when the reaction mixture began to boil. | Slightly greener. | Slightly lighter. | 120 |

*Table 2*

| Example | Procedure | Characteristics of pigment compared to Standard | | |
|---|---|---|---|---|
| | | Tint | Masstone | Tinctorial Strength, Percent |
| 8 | As described in Example 2 except that treatments with oxidizing agent and ferrous sulfate and reducing sugar were omitted. | Very much greener, considerably duller. | Much darker. | 70 |
| 9 | As described in Example 2 except 4.2 parts of 67% nitric acid used, no ferrous sulfate used. | Much greener. | Slightly lighter. | 110 |
| 10 | As described in Example 2 except no oxidizing agent used. | Considerably greener. | Slightly darker. | 105 |
| 11 | As described in Example 2 except 1.4 parts 67% nitric acid used and reducing sugar treatment omitted. | Much greener. | Much darker. | 50 |
| 12 | As described in Example 2 except 4.2 parts of 67% nitric acid used and reducing sugar treatment omitted. | ___do___ | Appreciably lighter. | 85–90 |
| 13 | As described in Example 2 except 7.0 parts of 67% nitric acid used and reducing sugar treatment omitted. | Very much greener, and duller. | Not tested. | Not tested. |

EXAMPLE 2

The sulfuric-acid purified indanthrone (35 parts) was mixed with 95% sulfuric acid (550.1 parts) and dissolved by stirring the mixture for twenty minutes at 25°–30°.

EXAMPLE 14

This example illustrates the practice of the present invention starting with crude instead of sulfuric acid-purified indanthrone.

Crude indanthrone (40 parts) containing about 90% color solid was dissolved in 95% sulfuric acid (597 parts) and subjected to the treatment described in Example 2, except that the reducing sugar treatment was terminated when the reaction mass began to boil.

The resulting pigment, when compared with the standard pigment employed in Example 1, was rated considerably redder and slightly duller in tint, considerably lighter in masstone, and 110% in tinctorial strength.

It will be evident that the invention is not limited to the details of the foregoing illustrative examples and that changes can be made without departing from the scope of the invention.

Thus, while in the above examples, the readily available C.P. nitric acid (67% nitric acid—41.5° Bé.) is employed, other forms of nitric acid may be used or, if desired, manganese dioxide or chromium oxide may be used in equivalent amounts. As employed herein, 1 mol of $HNO_3$ is equivalent to 1 mol of $MnO_2$ or $\frac{2}{3}$ mol of $Cr_2O_3$.

Although the readily available ferrous sulfate heptahydrate is employed as the reducing agent in the above examples, anhydrous ferrous sulfate, or any other water soluble ferrous salt of a non-oxidizing acid, or an alkali metal sulfite or bisulfite can be employed in equivalent amounts, for example, ferrous acetate, ferrous chloride, sodium sulfite, sodium bisulfite, potassium sulfite, or potassium bisulfite.

Glucose, which is available in a crude form as corn syrup, is used in the above examples in carrying out the reducing sugar treatment, in view of its low cost and availability; but any of the known reducing sugars can be employed.

From the above description of the invention it will be apparent that the invention provides a process for producing indanthrone in the form of pigments having the highly desirable reddish-blue color, tinctorial strength and brightness, and which are superior in redness of tint to the gamma-form of indanthrone as conventionally prepared and superior in tinctorial strength and brightness (and in some cases, in masstone) to the indanthrone produced by the process of U.S.P. 2,091,102; and that the process of the invention can be readily controlled to provide desired variations in said properties of the pigment, and can be carried out expeditiously and economically with readily available, inexpensive reagents and equipment.

The embodiments of the invention in which an exclusive property or privilege is claimed are defined as follows:

1. A process for producing indanthrone in the form of a reddish-blue pigment which comprises:
   (a) contacting indanthrone dissolved in sulfuric acid of 95% to 100% strength with an oxidizing agent selected from the group consisting of nitric acid, manganese dioxide and chromium trioxide in an amount equivalent to at least 0.04 part of $HNO_3$ per part by weight of sulfuric acid-purified indanthrone present in the indanthrone starting material, at a temperature below 90° C.;
   (b) drowning the resulting sulfuric acid solution in an aqueous solution of a reducing agent selected from the group consisting of water-soluble ferrous salts of non-oxidizing acids and alkali metal sulfites and bisulfites containing an amount of said reducing agent equal to at least 2 moles of $FeSO_4$ per mol of $HNO_3$ equivalent employed in (a);
   (c) recovering the resulting indanthrone pigment from the remaining solution;
   (d) mixing the resulting indanthrone pigment with an aqueous caustic alkali solution of a reducing sugar;
   (e) heating the resulting mixture to boiling; and
   (f) recovering the resulting indanthrone pigment from the remaining solution.

2. A process for producing indanthrone in the form of a reddish-blue pigment which comprises:
   (a) contacting indanthrone dissolved in sulfuric acid of 95% to 100% strength with an oxidizing agent selected from the group consisting of nitric acid, manganese dioxide and chromium trioxide in an amount equivalent to 0.05 to 0.15 part of $HNO_3$ per part by weight of sulfuric acid-purified indanthrone present in the indanthrone starting material, at a temperature of 20° to 40° C., for a period of about one-half to one hour;
   (b) drowning the resulting sulfuric acid solution in an aqueous solution of a reducing agent selected from the group consisting of water-soluble ferrous salts of non-oxidizing acids and alkali metal sulfites and bisulfites, which is at a temperature of about 60° to 70° C. and which contains an amount of said reducing agent equal to at least 2 mols of $FeSO_4$ per mol of $HNO_3$ equivalent employed in (a), while stirring vigorously;
   (c) recovering the resulting indanthrone pigment from the remaining solution by filtration;
   (d) mixing the resulting filter-cake with water, a caustic alkali and an amount of a reducing sugar in considerable excess of one mol per mol of $HNO_3$ equivalent employed in (a);
   (e) heating the resulting mixture to boiling; and
   (f) recovering the resulting indanthrone pigment by filtration.

3. A process for producing indanthrone in the form of a reddish-blue pigment which comprises:
   (a) contacting a sulfuric acid-purified indanthrone dissolved in sulfuric acid of 95% to 100% strength with nitric acid in an amount of equal to 0.05 to 0.15 part of $HNO_3$ per part by weight of the indanthrone starting material, at a temperature of 20° to 40° C., for a period of about one-half to one hour;
   (b) drowning the resulting sulfuric acid solution in an aqueous solution of ferrous sulfate which contains at least 2 mols of $FeSO_4$ per mol of $HNO_3$ employed in (a), while stirring vigorously;
   (c) recovering the resulting indanthrone pigment from the remaining solution by filtration;
   (d) mixing the resulting filter-cake with water, a caustic alkali and an amount of a reducing sugar in considerable excess of one mol per mol of $HNO_3$ employed in (a);
   (e) heating the resulting mixture to boiling; and
   (f) recovering the resulting indanthrone pigment by filtration.

4. A process for producing indanthrone in the form of a reddish-blue pigment which comprises:
   (a) contacting a sulfuric acid-purified indanthrone dissolved in sulfuric acid of 95% to 100% strength with nitric acid in an amount equal to 0.07 to 0.15 part of $HNO_3$ per part of indanthrone, by weight, at a temperature of 20° to 40° C., for a period of about one-half to one hour;
   (b) drowning the resulting sulfuric acid solution in an aqueous solution of ferrous sulfate which is at a temperature of about 60° to 70° C. and which contains at least 2 mols of $FeSO_4$ per mol of $HNO_3$ employed in (a) and 2.2 to 5 parts of water per part of sulfuric acid employed in (a), while stirring vigorously;
   (c) recovering the resulting indanthrone pigment from the remaining solution by filtration;
   (d) mixing the resulting filter-cake with water, a caustic alkali and an amount of a reducing sugar in considerable excess of one mol per mol of $HNO_3$ employed in (a);
   (e) heating the resulting mixture to boiling; and
   (f) recovering the resulting indanthrone pigment by filtration.

5. A process for producing indanthrone in the form of a reddish-blue pigment which comprises:
   (a) contacting a sulfuric acid-purified indanthrone dissolved in sulfuric acid of 95% to 100% strength with nitric acid in an amount equal to about 0.1 part of $HNO_3$ per part of indanthrone, by weight, at a temperature of 20° to 40° C., for a period of about forty minutes;
(b) drowning the resulting sulfuric acid solution in an aqueous solution of ferrous sulfate which is at a temperature of about 70° C. and which contains in great excess of 2 mols of $FeSO_4$ per mol of $HNO_3$ employed in (a) and 2.9 to 4.8 parts of water per part of sulfuric acid employed in (a), while stirring vigorously;
(c) recovering the resulting indanthrone pigment from the remaining solution by filtration;
(d) mixing the resulting filter-cake with water, a caustic alkali and an amount of a reducing sugar in great excess of one mol per mol of $HNO_3$ employed in (a);
(e) heating the resulting mixture to boiling; and
(f) recovering the resulting indanthrone pigment by filtration.

6. A process for producing indanthrone in the form of a reddish-blue pigment which comprises:
(a) contacting indanthrone dissolved in sulfuric acid of 95% to 100% strength with an oxidizing agent selected from the group consisting of nitric acid, manganese dioxide and chromium trioxide in an amount equivalent to 0.05 to 0.07 part of $HNO_3$ per part by weight of sulfuric acid-purified indanthrone present in the indanthrone starting material, at a temperature below 90° C.;
(b) drowning the resulting sulfuric acid solution in an aqueous solution of a reducing agent selected from the group consisting of water-soluble ferrous salts of non-oxidizing acids and alkali metal sulfites and bisulfites containing an amount of said reducing agent equal to at least 2 mols of $FeSO_4$ per mol of $HNO_3$ equivalent employed in (a); and
(c) recovering the resulting indanthrone pigment from the remaining solution.

7. A process for producing indanthrone in the form of a reddish-blue pigment which comprises:
(a) contacting a sulfuric acid-purified indanthrone dissolved in sulfuric acid of 95% to 100% strength with nitric acid in an amount equal to 0.05 to 0.07 part of $HNO_3$ per part of indanthrone, by weight, at a temperature of 20° to 40° C. for a period of about one-half to one hour;
(b) drowning the resulting sulfuric acid solution in an aqueous solution of ferrous sulfate which is at a temperature of about 70° C. and which contains in great excess of 2 mols of $FeSO_4$ per mol of $HNO_3$ employed in (a) and 2.9 to 4.8 parts of water per part of sulfuric acid employed in (a), while stirring vigorously; and
(c) recovering the resulting indanthrone pigment by filtration.

References Cited by the Examiner

UNITED STATES PATENTS 2,831,860    4/1958    Sutter et al.

OTHER REFERENCES

Lubs: The Chemistry of Synthetic Dyes and Pigments, pages 520–522, 524, published by Reinhold Publishing Corp., New York, 1955.

NICHOLAS S. RIZZO, *Primary Examiner.*